United States Patent [19]

Hauptmann

[11] Patent Number: 4,612,089
[45] Date of Patent: Sep. 16, 1986

[54] SURGE SUPPRESSION DEVICE

[75] Inventor: Edward G. Hauptmann, West Vancouver, Canada

[73] Assignee: Devron Engineering Ltd., North Vancouver, Canada

[21] Appl. No.: 590,143

[22] Filed: Mar. 16, 1984

[51] Int. Cl.$^4$ .............................................. D21F 1/06
[52] U.S. Cl. .................... 162/336; 137/207; 138/26; 138/30; 162/380
[58] Field of Search ............... 162/336, 380; 137/207; 138/26, 30

[56] References Cited

U.S. PATENT DOCUMENTS 4,116,259  9/1978  Koskimies et al. ................ 162/380
4,169,757 10/1979  Kirjavainen ........................ 162/380

Primary Examiner—Peter Chin
Attorney, Agent, or Firm—Spensley Horn Jubas & Lubitz

[57] ABSTRACT

Apparatus to reduce pressure pulsations in a pipe line. The apparatus comprises a central pipe to be connected to the pipe line. There is a resilient liner within the central pipe and an intermediate chamber is substantially concentric with the central pipe and open at each end. An opening in the central pipe is closed by the liner. Pressure variations in the central pipe are thus communicated to the intermediate chamber, which is attached to the central pipe. There is an outer chamber, closed at each end and substantially concentric with the intermediate chamber, and able to maintain a selected pressure.

17 Claims, 5 Drawing Figures

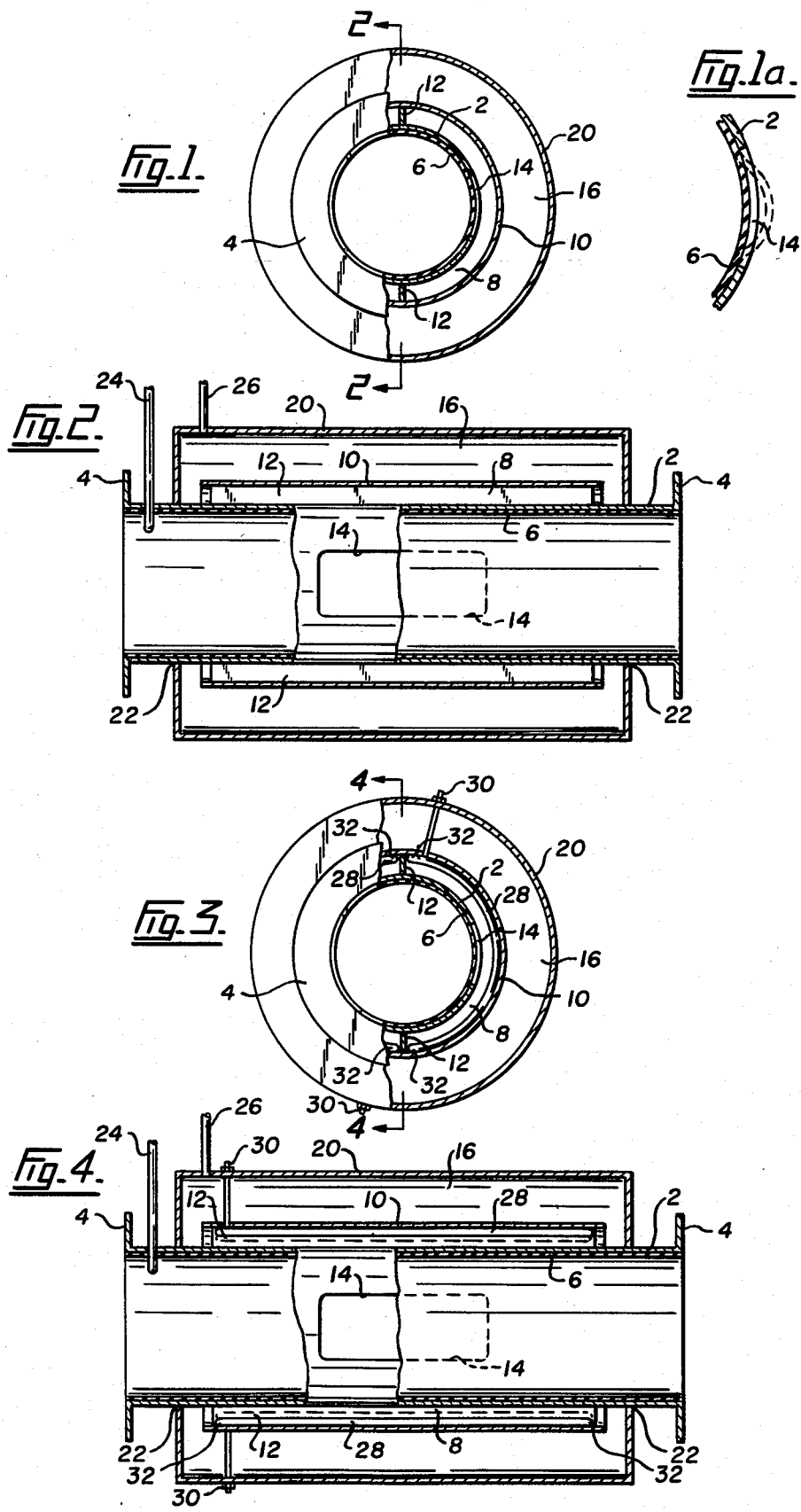

SURGE SUPPRESSION DEVICE

FIELD OF THE INVENTION

This invention relates to an apparatus to reduce pressure pulsations in a pipe line, particularly pressure pulsations in a pipe line used to transport pulp to a head box in a paper making machine.

The present invention finds application wherever undesirable pulsations are found in a pipe line but it finds particular application in the paper making machine where the defects in paper induced by pressure pulsations in the head box are well-known.

DESCRIPTION OF THE PRIOR ART

The head box of a paper making machine is a tank positioned before the machine wire. The head box controls the amount of paper stock flowing through the machine. The stock flows through an opening in the base of the head box onto the wire where the paper web is formed.

There is a consistent trend to increase the speeds of modern paper making machines. One aspect of this trend is the use on modern paper making machines of liquid filled head boxes. Early paper making machines had simple open head boxes. With this simple type of box problems concerning pressure pulsations were not known. However the advent of air loaded head boxes as the means of increasing the machine speed provided, in effect, a surge tank on top of a head box and consequent pressure fluctuations.

Surge suppression studies have become a crucial factor in head box design with the later development of liquid-filled head boxes, which have little or no air cushion capability.

A pressure fluctuation in a head box means an uneven discharge rate from the head box with the consequent production of uneven paper, that is paper whose thickness varies in the machine direction because of the differing amounts of stock fed onto the wire due to different pressures induced by pulsations. If one could eliminate the variation of thickness a paper of the same strength would be achieved (that is of the same minimum thickness as existing paper) but substantially less stock would be used. A conservative estimate is that the stock saving could be of the order of about 10%. On a modern paper making machine this is a saving of great economic interest.

Various techniques to suppress pulsations are known, some quite sophisticated. In a typical modern head box approach system, pulsation dampers consisting of air chambers connected to the stock pipe line are well-known. However such devices are of considerable volume and of fairly complicated structure.

SUMMARY OF THE PRESENT INVENTION

The present invention seeks to simplify greatly the structure of an effective apparatus to reduce pressure pulsations. Accordingly, in a first aspect the present invention is an apparatus to reduce pressure pulsations in a pipe line, the apparatus comprising: a central pipe adapted to be connected to the pipe line; a resilient liner within the central pipe; an intermediate chamber substantially concentric with the central pipe, open at each end; an opening in the central pipe closed by the liner whereby pressure variations in the central pipe may be communicated to the intermediate chamber; means attaching the intermediate chamber to the central pipe; an outer chamber, closed at each end, substantially concentric with the intermediate chamber and adapted to maintain selected pressures.

As indicated the apparatus is of particular application in reducing pressure pulsation in a pipe line to transport pulp to a head box in a paper making machine.

DRAWINGS

Aspects of the invention are illustrated, merely by way of example, in the accompanying drawings in which:

FIG. 1 is an end view, partly broken away, of an apparatus according to the present invention;

FIG. 1a is a detail of FIG. 1;

FIG. 2 is a view on the line 2—2 in FIG. 1;

FIG. 3 is a view similar to FIG. 1 of a second embodiment of the invention; and

FIG. 4 is a view on the line 4—4 in FIG. 3.

DETAILED DESCRIPTION OF THE EMBODIMENTS

The drawings illustrate an apparatus to reduce pressure pulsations in a pipe line, not shown. The apparatus comprises a central pipe 2 formed at each end with flanges 4 to enable connection to the pipe line. The pipe line will be appropriately modified, with corresponding flanges, to receive the illustrated apparatus. There is a resilient liner 6, typically an elastomer within the central pipe 2. An intermediate chamber 8 is formed around the central pipe 2. The intermediate chamber is formed by a second pipe 10, substantially concentric with central pipe 2 open at each end and attached to the central pipe 2 by spacing members 12 whose disposition is shown most clearly in FIG. 1. In the illustrated embodiment there are opposed openings 14 formed in the central pipe 2 although, of course, closed by the liner 6.

There is an outer chamber 16, closed at each end, and surrounding the intermediate chamber 12 but of slightly greater length. The outer chamber is formed by a third pipe 20 closed at each end and attached to the central pipe at 22. The outer chamber can be maintained at predetermined gas pressure. For simplicity the gas is usually air. However in an interesting aspect of the invention the gas may be varied depending on the frequency to be reduced. That is a gas may be selected whose physical properties are preferred to reduce frequency in a certain range. For example if helium is used the frequency reduced is increased; with a fluorocarbon such as that available under the trade mark Freon 12, the frequency is decreased. Blending of gases may be used to tune the apparatus for reduction of a particular frequency.

As shown particularly in FIG. 2 there is a pressure sensor 24 within the central pipe 2 and a pipe 26 allows sensing and variation of the gas pressure within the outer chamber 16. Pipe 26 also permits evacuation and filling of chamber 16.

In operation the pressure in the central pipe 2, that is the pipe line pressure, and the pressure in the outer chamber 16 are kept nearly equal so that the liner 6 is not bulged but stays in the solid line position shown in FIG. 1. When there is a pressure rise inside the pipe 2, induced by a pressure fluctuation, the liner 6 moves outwardly through the opening 14, as shown in broken lines in FIG. 1a, to impart a slight pressure pulse into the intermediate chamber 8. The outer chamber makes up a tuned cavity and can thus counteract the pressure pulse and transmit back through the liner a pulse to cancel the original pulsation in the pipe.

As to the theory of operation a peculiar difficulty in designing a device able to reduce pressure pulsations in a pulp mill is that the frequencies of the pressure pulsations are usually low, for example from 1 to 50 cycles per second. These frequencies may be below the audible range and the overall shape and size of the outer chamber, forming the tuned cavity, is dictated by the frequency. Without the present invention to get reduction of low frequency it is necessary to have impractically large chambers around a liquid pipe line. That is large pressure vessels would have to be positioned around the pipe line, at considerable expense. The problem is in deciding on an adequate sizing for the opening 14 in the central pipe 2 as opposed to the length of the intermediate chamber 8 (which forms the connecting link between the opening 14 and the tuned cavity, that is the outer chamber) and the volume of the tuned cavity. According to the present invention this problem is overcome by arranging the intermediate chamber between the opening 14 and the tuned cavity or outer chamber. The result is a very compact apparatus.

It should also be noted that the second pipe 10 acts as a protector for the liner 6. With a large pressure fluctuation in the central pipe 2 the interior of the second pipe 10 will act as a support to the liner to prevent rupturing of the liner.

The embodiment of FIGS. 1 and 2 can reduce pressure pulsations over a range of frequencies. The configuration of the volume of the apparatus outside the central pipe 2 (the resonating volume) dictates the frequency at which it is most effective.

In the embodiment of FIGS. 1 and 2 the pressure of fluid inside the central pipe 2 and the pressure inside the outer chamber 16 are measured, and the latter controlled accordingly. An approximate balance is obtained for the steady operating condition. Fluctuations around the steady operating condition are accommodated by the natural resonance of the cavity formed by the outer chamber with respect to the pipe. The dimensions of the intermediate chamber 8 and the volume of the apparatus outside the central pipe control the resonance frequency of the outer chamber 16 and therefore the ability of the apparatus to tune out pressure pulsations at a given frequency.

With pressure pulsations at various frequencies the need arises to be able to adjust continually the natural resonance frequency of the apparatus. The apparatus of FIGS. 3 and 4 illustrates this feature of the invention by including means to vary the effective volume of the intermediate chamber 8. The same reference numerals are used in FIGS. 3 and 4 for parts already shown in FIGS. 1 and 2.

Variation of the effective volume of chamber 8 is achieved by the provision of two flexible envelopes 28 occupying a variable proportion of the volume of the intermediate chamber 8. The envelopes 28 are each provided with a pipe 30 (only one of which is shown) to inflate and deflate it. The pipe 30 extends to the exterior of the apparatus. For example if the envelopes 28 were filled with air at the same pressure as the outer chamber 16 then air applied to the envelopes 28 would expand the envelopes 28 towards the central pipe 2, thereby decreasing the effective volume of the chamber 8 and thereby changing the resonating frequency of the apparatus.

The envelopes 28 are completely contained within the intermediate chamber 8 and may be located, for example at 32, if desired. The envelopes 28 run the entire length of the intermediate chamber 8, as illustrated in FIG. 4.

A large number of variations of the dimensions and details of the illustrated apparatus are possible. For example two openings 14 are shown but any number of openings can be used of widely varying shape. Similarly the elongate strips 12 locating the second pipe 10 may be replaced by any means of ensuring the fixed location of the inner pipe 2 and second pipe 10. The illustrated form provides stiffening to the inner pipe 2 where, as illustrated, the formation of relatively large openings 14 may weaken the central pipe 2. However smaller locating plates could be used if, for example, the openings were replaced by a plurality of smaller openings whose effect on the strength of the pipe was not so great.

The resilient liner 6 may be made from a wide variety of elastomers able to withstand frequent movement without attention. Such elastomers are well-known.

Central pipe 2 is shown with flanges 4 to permit its attachment to a pipe line. The apparatus may however be built into the line by welding in pipe 2 or the apparatus may be formed by forming openings 14 in a pipe line and attaching the pipes 10 and 20 to the pipe. The last method may not be ideal because of the necessity of introducing the liner 6.

I claim:

1. Appartus to reduce pressure pulsations in a pipe line, the apparatus comprising:
   a central pipe adapted to be connected to the pipe line and having an inner surface;
   a resilient liner on the inner surface of the central pipe;
   a first tubular housing located substantially concentrically around the central pipe to define an intermediate chamber between the central pipe and the first tubular housing and open at each end;
   an opening in the central pipe closed by the liner whereby pressure variations in the central pipe may be communicated to the intermediate chamber;
   means attaching the first tubular housing on the central pipe;
   a second tubular housing, substantially concentric with the first tubular housing and defining an outer chamber, between the first and second tubular housings, extending beyond each open end of the intermediate chamber so that the outer chamber communicates with the intermediate chamber through the open ends of the first tubular housing, having end walls extending from the end of the second tubular housing; thereby defining a passageway between the first housing to the central pipe, forming the outer chamber, the end walls being spaced away from the walls of the first tubular housing, thereby defining a passageway between the first housing and the second housing and having an inlet means for introducing a gas into the outer chamber so that a selected pressure may be maintained within the intermediate and outer chamber.

2. Apparatus as claimed in claim 1 in which the central pipe has two opposed openings.

3. Apparatus as claimed in claim 1 in which the means attaching the first tubular housing on the central pipe comprises elongate, opposed strips between the first tubular housing and the central pipe.

4. Apparatus as claimed in claim 1 in which the intermediate chamber is such that the liner, when extended into the intermediate chamber, contacts the first tubular housing before it can rupture. chamber before it can rupture.

5. Apparatus as claimed in claim 1 including means to sense the pressure within the central pipe.

6. Apparatus as claimed in claim 1 including means to vary the pressure in the outer chamber.

7. Apparatus as claimed in claim 1 including means to sense the pressure within the central pipe and means to vary the pressure in the outer chamber to coincide with the pressure sensed within the central pipe.

8. Apparatus as claimed in claim 1 including flexible means within the intermediate chamber to occupy a variable proportion of the volume of the intermediate chamber.

9. Apparatus as claimed in claim 8 in which the flexible means comprises at least one envelope;
   means to inflate and deflate the at least one envelope.

10. Apparatus as claimed in claim 9 in which the means to inflate and deflate the at least one envelope comprises a passageway extending from the envelope to outside the apparatus.

11. Apparatus as claimed in claim 1 wherein the gas introduced through the inlet means into the outer chamber is selected to have predetermined properties to assist in tuning the apparatus to reduce varying frequencies.

12. Apparatus to reduce pressure pulsations in a pipe line to transport pulp to a head box in a paper making machine the apparatus comprising:
   a central pipe adapted to connect in the pipe line;
   an opening formed in the wall of the central pipe;
   a resilient liner on the inner surface of the central pipe;
   a first tubular housing located substantially concentrically around the central pipe to define an intermediate chamber, between the central pipe and the first tubular housing and open at each end;
   means attaching the first tubular housing on the central pipe;
   a second tubular housing located on the central pipe, substantially concentric with the first tubular housing to define an outer chamber between the first and second tubular housings and extending beyond each open end of the intermediate chamber so that the outer chamber communicates with the intermediate chamber through the open ends of the first tubular housing, the second tubular housing having end walls extending from the tubular housing to the central pipe, forming the outer chamber, wherein the end walls are spaced away from the walls of the first tubular housing, thereby defining a passageway between the first housing and second housing;
   a passageway communicating the outer chamber to the exterior, whereby the pressure within the outer chamber may be varied.

13. Apparatus as claimed in claim 12 including means to sense the pressure within the central pipe; means to vary the pressure in the outer chamber to reflect the pressure sensed within the central pipe.

14. Appartus as claimed in claim 12 including flexible means within the intermediate chamber to occupy a variable proportion of the volume of the intermediate chamber.

15. Apparatus as claimed in claim 14 in which the flexible means comprises at least one envelope;
   means to inflate and deflate the at least one envelope.

16. Apparatus as claimed in claim 15 in which the means to inflate and deflate the at least one envelope comprises a passageway extending from the envelope to outside the apparatus.

17. Apparatus as claimed in claim 12 including means to introduce a gas of predetermined properties into the outer chamber to assist in tuning the apparatus to reduce varying frequencies.

* * * * *